March 26, 1946.  H. J. LE VESCONTE  2,397,279
SNAP LOCK HARNESS CLIP
Filed May 23, 1944
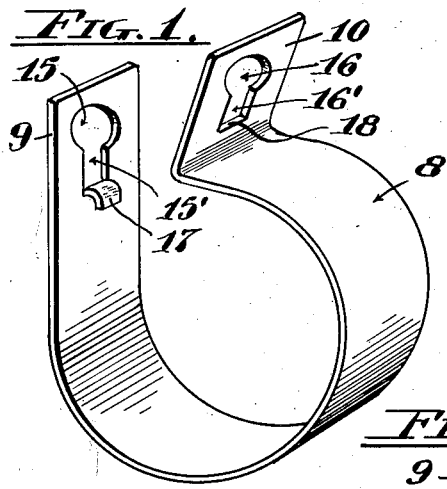
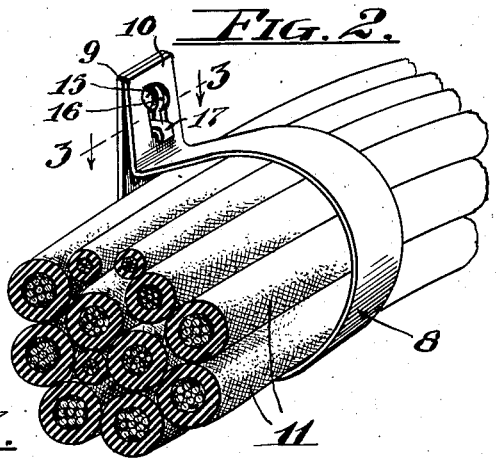
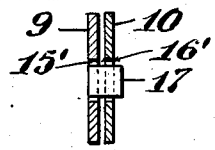
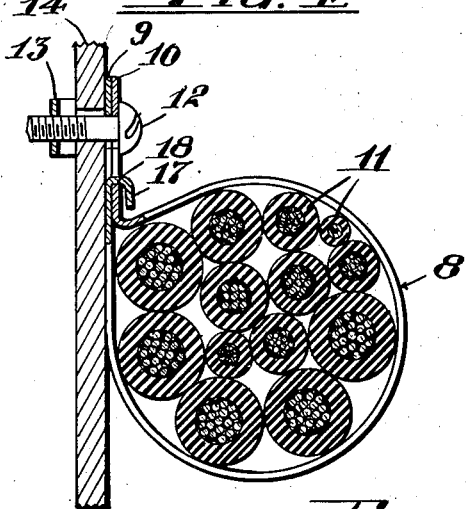
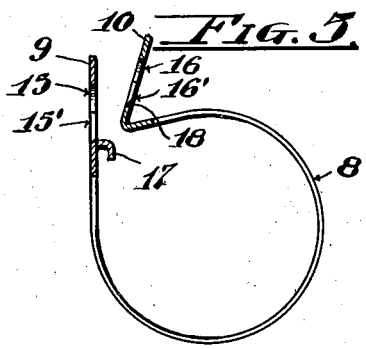
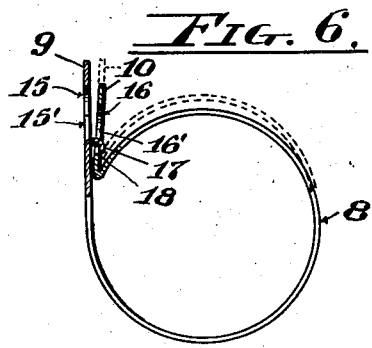
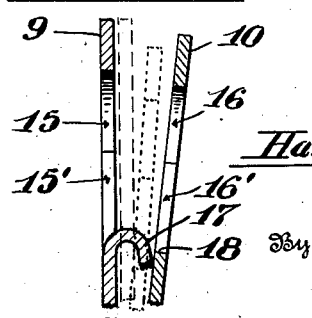
Inventor
Harold J. Le Vesconte
By R. S. Berry
Attorney Patented Mar. 26, 1946

2,397,279

UNITED STATES PATENT OFFICE 2,397,279

SNAP LOCK HARNESS CLIP

Harold J. Le Vesconte, Glendale, Calif., assignor to Adel Precision Products Corp., Burbank, Calif., a corporation of California Application May 23, 1944, Serial No. 537,013

6 Claims. (Cl. 248—74)

This invention relates to harness clips as used in aircraft to support wires or conduits in the desired position on structural parts of the aircraft past or adjacent which parts the wires or conduits are extended. Clips of this type are usually formed of a spring metal strap bent to provide an open clamping loop having outwardly extended normally spaced apart apertured end portions which are forced together to clamp the loop around the wires or conduit, and then secured to a support by means of a fastening which is passed through opening formed in the end portions. On the tightening of the fastening the end portions are drawn together to tightly clamp the loop around the wires or conduit and securely fasten the clip to the support.

An object of the invention is to provide a clip of the character described having a novel and efficient snap locking means formed in a simple and inexpensive manner in the end portions of the clamping loop conjunctively with the fastening-receiving openings therein, and comprising a hook extending from one end portion, and a cooperating lip being a marginal portion of the fastening-receiving opening in the other end portion, whereby upon bringing said portions together the hook will snap into tensioned and locked engagement with the cooperating lip portion to releasably lock the clip around the wires or conduit with the openings in said end portions aligned for reception of the fastening element, thus making it unnecessary to hold the end portions together by hand in installing the clip and facilitating sub-assembly and installation operations.

Another object is to provide a clip such as described in which a saving in strategic metal and in manufacturing costs and an appreciable reduction in weight, compared to snap lock clips heretofore made, are brought about by the forming of the hook as a struck-out part of the metal contiguous the fastening-receiving opening in one end portion of the clip when forming the latter, as well as by making the fastening receiving opening in the other end portion of larger than usual size to allow for the reception of the hook therein and the inter-locking of the hook therewith as well as the accommodation of the fastening therein.

With the foregoing objects in view together with such other objects and advantages as may subsequently appear the invention is carried into effect as illustrated by way of example in the accompanying drawing in which:

Fig. 1 is a perspective view of a clip embodying my invention as it would appear before installation on the wires and support:

Fig. 2 is a perspective view of the clip as it would appear in a sub-assembly with the wires, before being fastened to a support:

Fig. 3 is a cross sectional view taken on the line 3—3 of Fig. 2:

Fig. 4 is a vertical sectional view, partly in elevation of clip as would appear when installed:

Fig. 5 is a part side elevational and part vertical sectional view of the clip before installation:

Fig. 6 is a view similar to Fig. 5 showing the manner of locking the end portion of the clip together:

Fig. 7 is an enlarged fragmentary vertical sectional view showing the manner of locking the ends of the clip to one another.

Referring to the drawing more specifically it will be seen that a clip embodying my invention may be made of a spring metal strap formed as an open loop 8 having opposed outwardly extending and normally spaced apart end portions 9 and 10 adapted to be brought together to close the loop around the wires 11 or a conduit not shown and facilitate the fastening of the clip by means of a bolt 12 and nut 13 to a support 14 as shown in Fig. 4.

In accordance with my invention the ends 9 and 10 are formed with bolt receiving openings 15 and 16 in such manner as to provide a snap locking means operative to releasably lock the ends together incident to the forcing of the ends towards one another as indicated in Figs. 6 and 7, preliminary to the fastening of the clip to the support.

In the present instance the locking means includes a small hook 17 on the end portion 9 and a lip 18 on the end portion 10 over which lip the hook is engaged to lock the ends together. The hook 17 is formed by making the opening 15 of key-hole shape and striking out the metal which is cut to form the narrowed, rectangular elongation 15' of such an opening, then bending the struck out metal in the form of a hook. The opening 16 is of key-hole shape and at the inner end of the elongated portion 16' thereof, the lip 18 is provided. The hook 17 is extended toward the end portion 10 and is adapted to pass through the opening 16 and engage and snap past the lip 18 in locked engagement therewith as shown in Figs. 2, 4 and 6.

In use, the wires are mounted in a compact group within the open loop after which the end portions 9 and 10 are forced together so that the loop will be closed around the wires and the hook 17 will snap past the lip 18 and come into tensioned and locked engagement therewith. Figs. 6 and 7 show how the hook will ride over and depress the lip 18 and adjacent part of the loop so that the hook and lip will snap into locking contact with one another on pressing the ends 9 and 10 together. When thus locked together, the ends 9 and 10 are held with the openings 15 and 16 in registration for reception of the bolt 12 which on being tightened will draw the ends closer together and clamp the loop tightly around the wires as well as securely fasten the clip to the support as shown in Fig. 4.

After the clip is locked around the wires as shown in Fig. 2 it may be readily released and opened to place or remove a wire, by depressing the end portion 10 so as to disengage the lip 18 from the hook 17.

It should be noted that the interlocking parts are at one side of the portions of the openings 15 and 16 leaving an unobstructed opening through which the bolt 12 passes so that the insertion, turning and removal of the bolt will not be interfered with.

It is now seen that by forming registering keyhole openings 15 and 16 in the end portions 9 and 10 and an integral hook projecting from the transverse margin of the elongated portion of one of the openings so as to hook over the corresponding margin of the other opening, I provide a simple and efficient locking means with a minimum of material and forming operations and without requiring extensions of the end portions or increasing the area thereof beyond that of the ordinary apertured end portions having no locking means associated therewith. Also that the hook-forming operation is facilitated by reason of the hook being struck out at the outer end of the rectangular extension 15' of the keyhole-shaped opening.

The lock means hereof, that is, the hook element 17 is formed at the same time the bolt-receiving opening 15 is formed and therefore no extra forming operation is required. The opening 16 may be made of any shape other than here shown, provided it is large enough to accommodate the bolt and the hook at the same time, and will provide a "lip" or edge to lock with the hook. Thus no operation other than the formation of a "hole" is necessary to make the "lip" for contact with the hook and provide a space to receive the hook. Moreover the provision of a bolt opening in one end portion of the loop which opening also accommodates a hook carried by the other end portion of the loop and affords an interlocking of the end portions, is a feature of importance making for a conservation of material and a reduction of the number of forming operations, regardless of how the hook is formed on the end portion supporting it.

A further advantage is that the hook arranged as here provided to interlock with the opening in one end of the loop may be made much smaller than the hook elements as heretofore provided in this art and the clip and as whole made smaller and lighter without reducing the capacity of the loop.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a clip for supporting wires or a conduit, a spring metal strap formed as a normally open loop having outwardly extending end portions adapted to be brought together to close the loop and clamp it around the wires or conduit, said end portions having openings in them to receive a fastening for securing the end portion to a support, and a hook member on one of said end portions adapted to extend through the opening in the other end portion and hook around a marginal portion thereof to hold said end portions together with said openings in registration and substantially unobstructed for reception of said fastening.

2. In a clip for supporting wires or a conduit, a spring metal strap formed as a normally open loop having outwardly extending end portions adapted to be brought together to close the loop and clamp it around the wires or conduit, said end portions having openings in them to receive a fastening for securing the end portion to a support, and a hook on one of said end portions extending toward the other end for hooked engagement therewith to hold said end portions together with the openings in them in registration and substantially unobstructed for reception of said fastening, said other end portion having the opening therethrough of sufficient size to receive the fastening and the hook at the same time.

3. In a clip for supporting wires or a conduit, a metal strap formed as a normally open loop having outwardly extending end portions adapted to be brought together to close the loop and clamp it around the wires or conduit, said end portions of the closed loop tending to spring apart and having openings in them to receive a fastening for securing the end portion to a support, and a hook on one of said end portions extending toward the other end for hooked engagement therewith to hold said end portions together with the openings in them in registration and substantially unobstructed for reception of said fastening, said other end portion having the opening therethrough of sufficient size to receive the fastening and the hook at the same time.

4. In a clip for supporting wires or a conduit, a spring metal strap formed as a normally open loop having outwardly extending end portions adapted to be brought together to close the loop and clamp it around the wires or conduit, said end portions having openings in them to receive a fastening for securing the end portion to a support, and a hook member on one of said end portions adapted to extend through the opening in the other end portion and hook around a marginal portion thereof to hold said end portions together with said openings in registration and substantially unobstructed for reception of said fastening, said hook and marginal portions being relatively arranged so that they will snap into hooked engagement with one another upon the pressing of said end portions together.

5. In a clip for supporting wires or a conduit, a spring metal strap formed as a normally open loop having outwardly extending end portions adapted to be brought together to close the loop and clamp it around the wires or conduit, said end portions having openings in them to receive a fastening for securing the end portion to a support, said openings being elongated and adapted to receive the fastening in their outermost portions, and a hook struck out from one of the end portions at a point forming the margin of the inner end of the opening therein and extending toward the other end portion and adapted to hook around the margin of the inner end of the opening through said other end portion to hold said end portions together with the opposite end portions of the openings therein substantially unobstructed and in registration with one another for reception of said fastening.

6. In a clip for supporting wires or a conduit, a spring metal strap formed as a normally open loop having outwardly extending end portions adapted to be brought together to close the loop and clamp it around the wires or conduit, said end portions having openings in them to receive a fastening for securing the end portion to a support, said openings being elongated and adapted to receive the fastening in their outermost portions, and a hook struck out from one of the end portions at a point forming the margin of the inner end of the opening therein and extending toward the other end portion and adapted to hook around the margin of the inner end of the opening through said other end portion to hold said end portions together with the opposite end portions of the openings therein substantially unobstructed and in registration with one another for the reception of said fastening, said other end portion and a part of the loop contiguous therewith being subject to being pressed inwardly to disengage the hook.

HAROLD J. LE VESCONTE.